Patented June 29, 1954

2,682,133

UNITED STATES PATENT OFFICE 2,682,133

APPARATUS FOR THE CONTINUOUS PRODUCTION OF CORRUGATED SHEET GLASS

Roger Guilleminot, Paris, France

Application February 11, 1953, Serial No. 336,394
Claims priority, application France
February 20, 1952

5 Claims. (Cl. 49—22)

1

Patent specification No. 2,590,768 described apparatus for the continuous production of corrugated glass sheet, comprising an endless chain the successive interconnected segments of which are provided with alternately concave and convex moulding elements. The said elements are adapted to assume a juxtaposed relationship to one another during those periods in which the chain segments supporting them are located in the upper horizontal flight of the endless chain, whereupon the moulding elements define a sort of corrugated mould adapted to receive the molten glass and impart the desired shape to its while it hardens. After the glass has assumed a sufficiently solid consistency to be capable of supporting its own weight, the corrugated sheet thus produced is passed into an annealing oven or vault, while the endless chain with the elements supported by it continues to travel around its end drums to return to its original position.

As the chain passes around the end drum, its segments riding over the drum, the concave and convex mould elements open out with respect to one another. It is important that this opening-out or spreading-apart effect, at the time it occurs, will exert no adverse action on the hardened sheet of glass, such as breaking the sheet. For this purpose, provision was made in the patent for lowering the concave ones of the mould elements as they pass around the drum, so as to disengage the latter, this lowering motion being facilitated by the fact that the mould elements are joined to one another at the inflexion points of the corrugations.

It is an object of this invention to provide improvements in the apparatus of the specified type, for imparting the requisite lowering or collapsing motion of the concave mould elements as they pass over the drum, as well as further features of construction.

According to the invention, the concave mould elements are pivoted to the segments of the endless chain, and cooperate with stationary guide means which cause them to collapse at the instant the chain segments carrying the mould elements are taken up around said end drum.

In one embodiment, the concave elements are pivoted on the forward pivotal axis of the chain segment carrying it. The elements are provided with rollers engaging a stationary runway formed with an inclined surface adjacent the entrance point to the drum, the said inclined surface being so determined as to cause the concave element to disengage the corrugated glass sheet.

2

Figure 1:
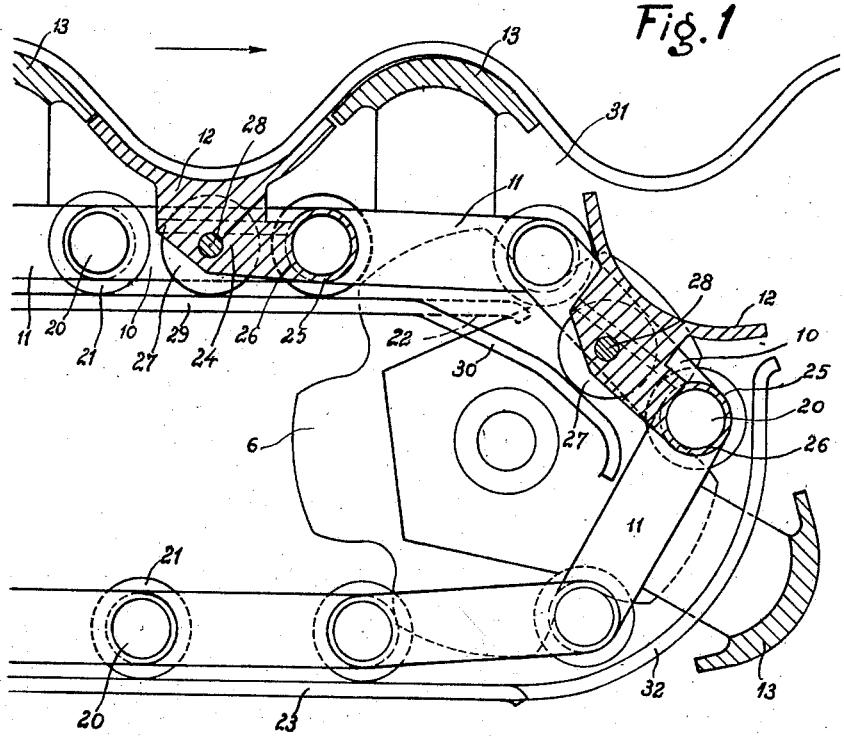
Figure 2:
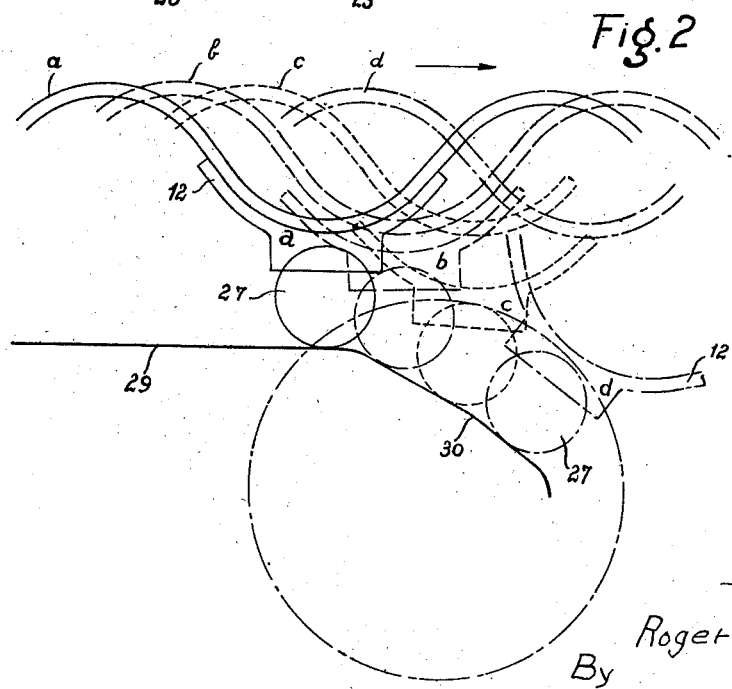

This arrangement is more fully described with reference to the accompanying drawings wherein:

Fig. 1 is a longitudinal section of one end of the undulating endless chain;

Fig. 2 diagrammatically illustrates the operation of the chain and particularly the motion of the concave elements.

As described and shown in the aforementioned patent, the endless chain comprises segments 10 and 11 interconnected by pivots 20 carrying rollers 21 running on a runway 22 extending under the upper flight of the chain, and a runway 23 extending under the lower flight of the chain.

The chain thus provided is trained at its ends around revolving drums one at least of which is power-driven. The right end drum 6 has been shown as constructed both for supporting the chain segments 10, 11 during the rotation of the chain and for driving meshing engagement with said segments.

The chain segments 11 carry the convex mould elements 13. These elements are rigidly secured to the chain segments, and are preferably integral therewith. The concave-surfaced elements 12 associated with the chain segments 10, on the other hand, are not secured to the latter.

According to the invention, the elements 12 each comprise, in addition to the concave portion constituting the mould for shaping the glass, an angular supporting portion 24. Formed in that leg of the angular portion which does not carry the concave surface, and adjacent the end 25 thereof, is a bore 26. The bore 26 serves to mount the element 12 upon the front axis of the chain segment 10, in such a way that the element is pivotable bodily about said axis.

Mounted on the support 24 adjacent the edges of the chain, are rollers 27 freely rotatable about pivots such as 28.

Extending beneath the rollers 27 is a specially provided runway 29 separate and distinct from the runway 22 for rollers 21. Throughout the straight part of the path of motion of the chain, the runway 29 extends in a common horizontal plane with the runway 22. Adjacent the drum 6 however, the runway 29 is inclined, as shown at 30, over a suitable length extending beyond the end of runway 22.

It will be seen that owing to this arrangement, the concave elements 12 are pivoted on the front axes of the segments 10 and are adapted to rock about said axes to conform with the displacements imparted to the rollers by the runways 29, 30.

In the horizontal flight of the chain, wherein the ways 22 and 29 lie on a common level, the elements 12 and 13 are juxtaposed and define an uninterrupted undulating surface over which the glass sheet spreads, is shaped and sets to the desired shape.

As the chain passes over the drum 6, the convex elements 13 unitary with the segments 11 rotate therewith without any relative displacement therebetween. The concave elements 12 on the other hand are guided by their rollers 27 which follow the inclined portion 30 of the runway 29, so that they are caused to pivot about the front axes of the said segments 10 and are lowered a short distance. As shown in Fig. 2 they are thus caused immediately to disengage the glass sheet and are separated therefrom, whereby the sheet is enabled to continue on its path of travel without interference from the rear edge of the concave element 12. In other words, the relative opening between the contiguous two elements 12 and 13, which necessarily occurs at 31 (Fig. 1) as the chain passes over the drum 6, does not result in any objectionable action upon the glass sheet which at that time is in hardened condition.

The progressive displacement of the concave element 12 is clearly visible in Fig. 2, where the element is illustrated in its successive positions a, b, c, d, relative to the corrugated glass sheet.

An outer guide 32 is provided adjacent the lower part of drum 6. This guide is adapted to be engaged by the rollers 27 of the concave elements 12 and serves to prevent these elements, which are freely rotatable, from rocking about the axes 20 of the associated segments. In this manner, the elements 12 maintain a correct position during the rotation of the chain upon the drum 6. During the return travel of the chain to its lower portion, they are maintained in position by the runway 23.

A similar arrangement may be used in connection with the other drum 5, at the forward end of the endless chain.

What I claim is:

1. In apparatus for the continuous production of corrugated glass sheet, in which the molding of the glass is effected by means of alternately concave and convex elements carried by a movable endless chain, the segments of which are pivoted on transverse axes, and extending about two end drums, the said concave and convex elements being adapted to assume a juxtaposed relationship over a straight section of the chain in order to constitute a continuous movable corrugated surface, the arrangement according to which the convex elements are carried by every other segment of the chain, the concave elements are situated in the intervals included between the convex elements, pivotally mounted on the axes of every other segment of the chain and a stationary guiding means is provided under the chain for supporting the concave pivoted elements, the said guiding means being adapted to cause a local lowering of the concave elements at the times the chain segments engage the end drum to cause the sagging of the concave elements at the moment when they become separated from the glass sheet.

2. In apparatus for the continuous production of corrugated glass sheet, in which the molding of the glass is ensured by means of alternately concave and convex elements carried by a movable endless chain the segments of which are pivoted on transverse axes and extending about two end drums, the said concave and convex elements being adapted to assume a juxtaposed relationship over a straight section of the chain in order to constitute a continuous movable corrugated surface, the combination in which the convex elements are carried by every other segment of the chain, the concave elements are in the intervals comprised between the convex elements and are carried by block members pivoting about the axes of every other segment of the chain, rollers carried by the block members, and a stationary runway under the chain, upon which the said rollers travel, the said runway being inclined in the vicinity of the chain winding drum in order to cause the sagging of the concave elements at the moment when they become separated from the glass sheet.

3. An apparatus for the continuous production of corrugated glass sheet comprising a pair of spaced drums, an endless chain mounted for movement on said drums, said chain having a plurality of link segments and pivots connecting each segment to adjacent segments for relative pivotal movement about axes extending transversely of the chain, a plurality of convex elements, one of said convex elements being carried by every other segment of said chain, a plurality of concave elements associated with the other segments of the chain and positioned in the intervals between adjacent convex elements, means pivotally mounting the concave elements on alternate pivots for pivotal movement independently of the segments of the chain, and a stationary support guide positioned under the chain between the drums for supporting the concave elements in a position to form with the convex elements a corrugated glass supporting surface, said support guide being inclined downwardly adjacent one of said drums to effect a lowering of the concave elements as their associated segments of the chain engage the drum.

4. An apparatus according to claim 3 further comprising rollers carried by the concave elements and engaging the support guide.

5. An apparatus according to claim 3 further comprising rollers carried by the concave elements and engaging the support guide, rollers carried by the pivots and means for supporting the pivot carrying rollers and the segments between said drums.

References Cited in the file of this patent

UNITED STATES PATENTS

| Number | Name | Date |
| --- | --- | --- |
| 972,433 | Blackmore | Oct. 11, 1910 |
| 2,590,768 | Guilleminot et al. | Mar. 25, 1952 |